UNITED STATES PATENT OFFICE.

SPENCER B. NEWBERRY, OF SANDUSKY, OHIO, ASSIGNOR OF ONE-HALF TO GEORGE R. FISHBURNE, OF CHARLESTON, SOUTH CAROLINA.

PROCESS OF MAKING FERTILIZER.

978,193.

Specification of Letters Patent. Patented Dec. 13, 1910.

No Drawing. Application filed August 24, 1908. Serial No. 450,044.

*To all whom it may concern:*

Be it known that I, SPENCER B. NEWBERRY, a citizen of the United States, residing at Sandusky, in the county of Erie and State of Ohio, have invented certain new and useful Improvements in Processes of Making Fertilizer, of which the following is a specification.

It is well known that the phosphate of lime contained in native phosphate rock and apatite is present in these materials in an insoluble form, and it is not available for absorption by plants until converted into a soluble form by chemical treatment. The process practically universally followed is treatment by sulfuric acid.

I have found that a product of high fertilizing value, in which nearly all the phosphoric acid is in the citrate soluble condition, may be obtained by grinding native or mineral phosphate rock or bone phosphate with lime, adding to the mixture a relatively small amount of a flux consisting of soda or potash in carbonate form, calcining the mixture at an orange or white heat, preferably in rotary kilns in a manner similar to the burning of Portland cement, and grinding to powder the semi-fused product of the calcination.

In place of lime, carbonate of lime, gypsum, or other lime compound which is converted into lime at the temperature of calcination, may be employed.

The amount of lime and soda or potash required varies with the composition of the phosphate treated; I have, however, obtained the best results by the use of an amount of lime approximately equal to the total phosphoric acid, and an amount of sodium carbonate approximately equal to one-half the phosphoric acid present. One hundred parts of a phosphate rock containing 30 per cent. phosphoric acid would therefore require approximately 30 parts lime and 15 parts sodium carbonate, or equivalent amounts of other compounds of lime and soda.

By the above described process I obtain a product in which all but an insignificant part of the phosphoric acid contained is soluble in ammonium citrate solution and therefore in condition to be readily absorbed from the soil in the process of plant growth.

This product is superior to ordinary commercial super-phosphate obtained by the sulfuric acid process on account of its higher percentage of phosphoric acid and freedom from sulfuric acid, and the fact that the phosphoric acid contained in it, while gradually soluble in the acids of the soil and absorbable by plants, is not soluble in water, and therefore not readily leached out and carried away by the percolation of water through the soil.

What I claim and desire to secure by Letters Patent is:

1. The process of conversion of insoluble phosphate of lime into citrate soluble form by calcination with lime and an alkaline carbonate.

2. The process of conversion of insoluble phosphate of lime into citrate soluble form by calcination with an amount of lime approximately equal to the phosphoric acid, and an amount of sodium carbonate approximately equal to one-half the phosphoric acid, contained in the phosphate treated.

3. The process of conversion of insoluble phosphate of lime into citrate soluble form by calcination with lime and alkali.

In testimony whereof I affix my signature in presence of two witnesses.

SPENCER B. NEWBERRY.

Witnesses:
I. H. NUBER,
LOUIS F. STEIN.